April 14, 1970 P. McHENRY ALBERT 3,506,360
TURBIDITY INDICATOR USING SUPERIMPOSED CONVERGING LIGHT BEAMS
Original Filed Sept. 30, 1963 4 Sheets-Sheet 1

INVENTOR.
Paul McHenry Albert
BY
Barnard, McGlynn & Reising
ATTORNEYS

INVENTOR.
Paul McHenry Albert
BY
Barnard, McGlynn & Reising
ATTORNEYS

April 14, 1970 P. McHENRY ALBERT 3,506,360
TURBIDITY INDICATOR USING SUPERIMPOSED CONVERGING LIGHT BEAMS
Original Filed Sept. 30, 1963 4 Sheets-Sheet 3

INVENTOR.
Paul McHenry Albert
BY
Barnard, McGlynn & Reising
ATTORNEYS

April 14, 1970  P. McHENRY ALBERT  3,506,360
TURBIDITY INDICATOR USING SUPERIMPOSED CONVERGING LIGHT BEAMS
Original Filed Sept. 30, 1963  4 Sheets-Sheet 4

INVENTOR.
Paul McHenry Albert
BY
Barnard, McGlynn & Reising
ATTORNEYS

United States Patent Office 3,506,360
Patented Apr. 14, 1970

3,506,360
TURBIDITY INDICATOR USING SUPERIMPOSED CONVERGING LIGHT BEAMS
Paul McHenry Albert, Ann Arbor, Mich., assignor, by mesne assignments, to Gamrad, Inc., Dearborn Heights, Mich., a corporation of Michigan
Continuation of application Ser. No. 312,431, Sept. 30, 1963. This application Oct. 30, 1967, Ser. No. 683,077
Int. Cl. G01n *21/00, 21/06, 21/26*
U.S. Cl. 356—103                                       6 Claims

ABSTRACT OF THE DISCLOSURE

A device for providing an indication of the turbidity level of a fluid using a light system and the Tyndall effect.

---

This application is a continuation of my copending application, Ser. No. 312,431 for Turbidity Indicator, filed Sept. 30, 1963, now abandoned.

This invention relates to apparatus for determining turbidity in a fluid and particularly useful for obtaining accurate readings albeit the turbidity level of the fluid is very low.

Devices for determining the turbidity of fluids, liquids or gases, are well known and are one or the other of two general types. The first and perhaps most common type incorporates a light-sensitive element arranged on one side of the fluid to be tested and a light source arranged on the opposite side facing the light sensitive element whereby the turbidity is measured by determining the extent to which the light passing through the test fluid is absorbed by the particles. This absorption-type turbidity indicator is useful for measuring high turbidity level fluids but does not provide accurate readings where the turbidity level is low. The second general type turbidity indicator, particularly useful for measuring low turbidity level fluids, utilizes the so-called Tyndall effect. By the Tyndall effect is meant the phenomenon whereby light rays are reflected through an angle by the particles which cause the turbidity. Hence, by positioning the photosensitive element at an angle to the direction of the light beam and measuring the intensity of the reflected light, the concentration of particles in the fluid, and therefore its turbidity, can be determined. It will be manifest that whereas in an absorption-type device, the amount of light received by the light-sensitive element is inversely proportional to the turbidity, in a Tyndall-effect type device, the amount of light received by the light-sensitive element increases with increased turbidity. Further, in the devices which operate on the principle of the Tyndall effect, even though the phenomenon relied upon for the readings is that of light reflection, nevertheless there is inherently also light absorption by the particles which can affect the readings. It is for this reason that the Tyndall effect is chiefly useful for measuring only relative clear or low turbidity fluids since with high turbidity the absorption effect is so great as to reduce the Tyndall effect. And where the Tyndall effect is used to measure low turbidity fluids, the greatest hazard to accurate readings is uncontrolled light scattering within the system which can vary the light intensity level read by the photosensitive element disproportionately to the amount of turbidity actually present.

It is an object of the present invention to provide an improved Tyndall-effect type turbidity indicator which provides good sensitivity and highly accurate readings and yet which is of compact relatively low-cost simple construction. More specifically, it is an object of the invention to provide a turbidity indicator which incorporates at least one and preferably a plurality of photosensitive elements to measure the light reflected by the particles in the fluid from a plurality of light beams directed therethrough, the arrangement of the components being such as to provide optimum sensitivity and accurate readings, particularly for low turbidity level fluids. Another object of the invention is the provision of a turbidity indicator which provides excellent sensitivity and accurate readings for low, intermediate and high level turbidity fluids.

Briefly, these objects are accomplished in accordance with the invention by a device which includes a chamber for the fluid to be measured, means for projecting through said chamber from opposite walls thereof a pair of opposed light beams, each of which converges from the wall through which it enters the chamber toward the oppositely disposed wall, and at least one and preferably a pair of photosensitive elements, each with a viewing field disposed at a ninety degree angle to the axis of the opposed light beams. Each of the converging opposed light beams is such that its image point, or point of complete convergence, is beyond the axis of the viewing field and preferably beyond the oppositely disposed chamber wall. Where the viewing chamber is connected into the fluid system such that there is fluid flow through the chamber, as is preferred, the fluid connections are oriented such that the flow is at right angles both to the axis of the opposed light beams and to the viewing axis. Hence, the turbidity particles flow through the chamber, are illuminated from two sides as they pass through the opposed convergent light beams, and are seen from two sides as they pass through the intersection of the light beams and the viewing axis. Such system is outstandingly effective, particularly for low turbidity level fluids, in that it provides optimum sensitivity, with instantaneous detection of even minor variations in turbidity as the fluid flows through the chamber, and in minimizing the effect of stray light from the walls of the chamber and/or from turbidity particles outside of the viewing field thereby affording extremely accurate readings.

In the preferred embodiment of the invention the photosensitive element and light source systems are so arranged as to provide a device which is not only of relatively simple and therefore inexpensive and trouble-free construction, but which is also highly compact so that it requires minimum installation space. Further in accordance with the invention, embodiments are provided which are particularly useful for the measurement of turbidity in low, intermediate, and high turbidity level fluids and which incorporate photosensitive element viewing fields oriented to measure both the Tyndall effect and the absorption effect of the turbidity within the fluid. Hence, where measurement is to be taken of a low turbidity fluid, Tyndall effect readings can be taken to provide optimum accuracy, where a fluid of intermediate turbidity is to be measured, both Tyndall effect and absorption effect readings can be taken such that the combination thereof provides optimum accuracy readings, and where a high turbidity level fluid is to be measured only absorption effect readings can be taken, such being the most effective in providing accurate measurement of high turbidity.

The above and other objects, features and advantages of the invention will appear more clearly from the following detailed description of various preferred embodiments thereof made in reference to the drawings in which.

Figure 1:
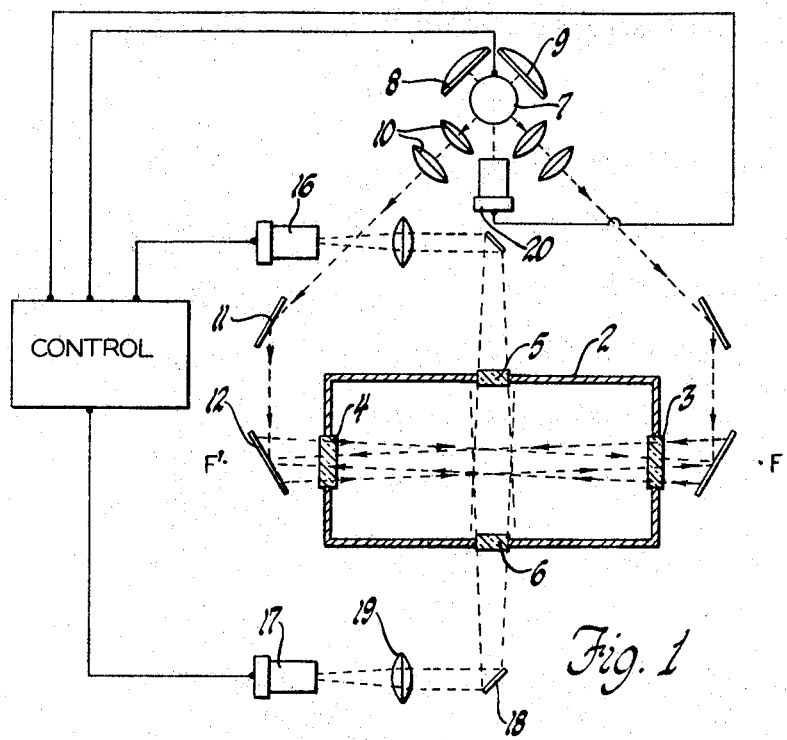
FIGURE 1 is a diagrammatic view of the light directing, light sensing and control systems of the preferred embodiment of the invention.

Referring now to FIGURE 1, the system shown comprises a viewing chamber 2 of generally rectangular cross section having light beam admitting windows 3 and 4 in a pair of oppositely disposed walls thereof and a pair of viewing windows 5 and 6 in the other pair of oppositely disposed walls thereof. Preferably the chamber is connected in a fluid system such that the fluid, say water, flows through the chamber in a direction perpendicular to the axes between the pairs of windows, i.e. perpendicular to the plane of the FIGURE 1 drawing. It will be understood, however, that the system can be embodied in an immersion type turbidity indicator wherein the fluid within the chamber will be relatively quiescent, not flowing, when the reading is taken.

A light source, comprising a light bulb 7 and a pair of spherical mirrors 8 and 9, projects a pair of identical light beams oriented at about 90° to each other, as shown. The spherical mirrors capture the light from the point source and refocus it to the source of origin thereby substantially increasing the intensity of the light at the point of origination; this in turn, of course, results in a substantial increase in the intensity of the light transmitted through the succeeding lens system. This allows the bulb 7 to be operated at a lower applied potential thereby increasing its life and also permitting subsequent increases in bulb potential to compensate for loss of efficiency due to bulb aging. The optical system for each light beam includes a condensing lens system 10 which can be either a single lens or a plurality of lenses as shown, and flat mirrors 11 and 12 oriented to direct the light beam through the light admitting window toward the opposite wall of the chamber. The condensing lens system 10 provides a convergent light beam (for simplicity in the diagrammatic showing, the convergence is indicated only from the mirror through the chamber, it being understood, however, that the convergence in fact occurs or commences at the lens system 10), the image point of the lens system and therefore of the light beam being beyond the oppositely disposed chamber wall as indicated at F in FIGURE 1. As mentioned above, the optical systems for the two oppositely directed light beams are substantially identical, the image point of the light beam directed through window 3 being beyond the wall oppositely disposed therefrom as indicated at F'. Hence, in the preferred embodiment shown, the convergent light beams passing through the chamber are in direct opposition to each other with a common longitudinal axis; however, it will be understood that the oppositely directed beams can be at a slight angle with respect to each other so long as they intersect and overlap in the viewing field. My copending U.S. Patent No. 3,177,760, issued Apr. 13, 1965 shows a system wherein opposed light beams with axes at a slight angle to each other are used.

The light viewing system shown in FIGURE 1 comprises a pair of photosensitive elements 16 and 17 having identical optical systems for viewing the interior of the chamber 2 on an axis perpendicular to the axis of light beams through the oppositely disposed windows 5 and 6. Each optical system comprises a flat mirror 18 positioned behind the viewing window and at an angle to reflect the light received through the viewing window at an angle of 90° through the condensing lens 19 and onto the photosensitive face of the photosensitive element. The mirror 18 is positioned a short distance behind the light aperture defined by the window 6 and the diameter of the window is such that the viewing field of the photosensitive element 17 is slightly divergent extending outwardly from the window 6 toward the oppositely disposed wall of the chamber. The condensing lens 19 is such as to focus the light beam from the mirror 18 so that when it strikes the photosensitive element, it covers an area substantially coextensive with the light sensitive face or aperture thereof. To accomplish the very slight divergent viewing fields for each photosensitive element and the condensing of the light beams onto the photosensitive faces or apertures of the cells requires that the photosensitive cell be positioned a considerable optical distance beyond its viewing window. By using mirrors 18 to reflect the light through an angle as shown and described, this optical distance is accomplished while yet providing a very compact instrument since it allows the photosensitive elements to be physically positioned close to the side walls of the chamber 2.

Figure 2:
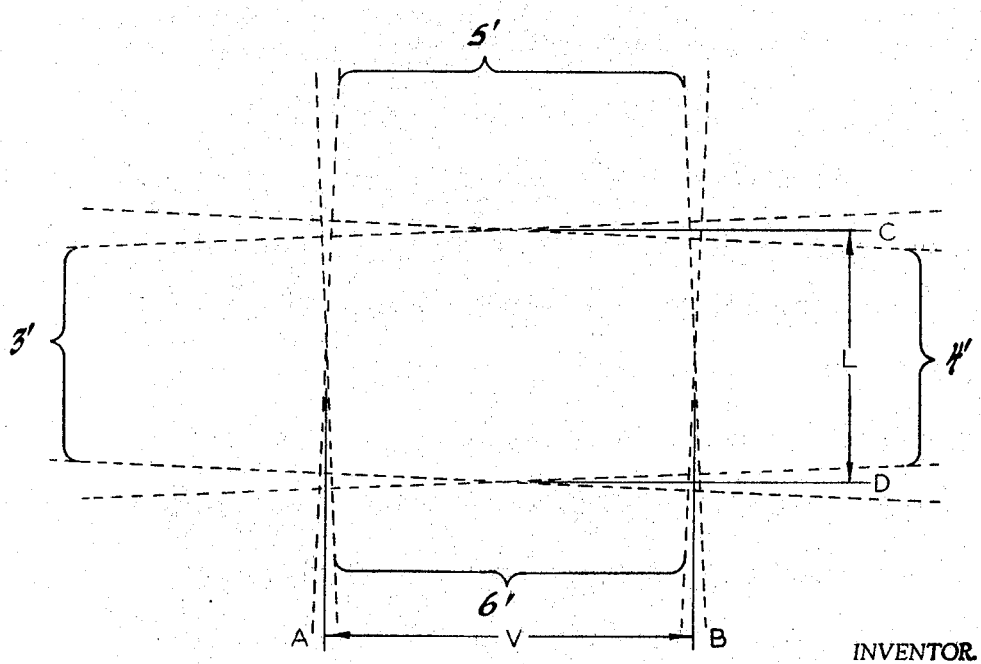
FIGURE 2 is an enlarged diagrammatic view of a portion of the system shown in FIGURE 1 and illustrates the shapes and relationship of the light beams and the viewing fields at the intersection of the axes thereof.

As indicated above, the angle of convergence of each of the opposed light beams should be such that the image point for each of the beams entering the chamber is beyond the axis of the viewing field and preferably somewhat beyond the oppositely disposed wall of the chamber as shown. The diameter of the viewing field at its point of intersection with the light beams should be at least as great as the diameter of the light beams at the point of intersection and preferably slightly greater, though in no instance more than twice as great. The relationship between the opposed light beams and the viewing fields at the point of intersection thereof is best shown in FIGURE 2. In this figure 3' indicates the light beam entering through the window 3, 4' the light beam entering through the window 4, 5' the viewing field of the window 5 and 6' the viewing field of the window 6. L is the diameter of both light beams at the center of the viewing field and V is the diameter of both viewing fields at the center of the light beams. It will be noted that the diameter V is somewhat greater than the diameter L though not as great as 2L. Such a viewing field provides optimum sensitivity commensurate with avoiding inaccurate readings by reason of stray light.

By using convergent light beams rather than collimated or divergent beams, the highest possible light flux is obtained at the viewing axis without significant sacrifice in the width of the beams at their point of intersection with the viewing axis. Hence, optimum sensitivity is accomplished. Further, by using convergent beams there is assurance that the light from each beam, other than the light reflected by the particles, passes out of the oppositely disposed light admitting window thereby minimizing reflection from the oppositely disposed wall and hence stray light.

Figure 3:
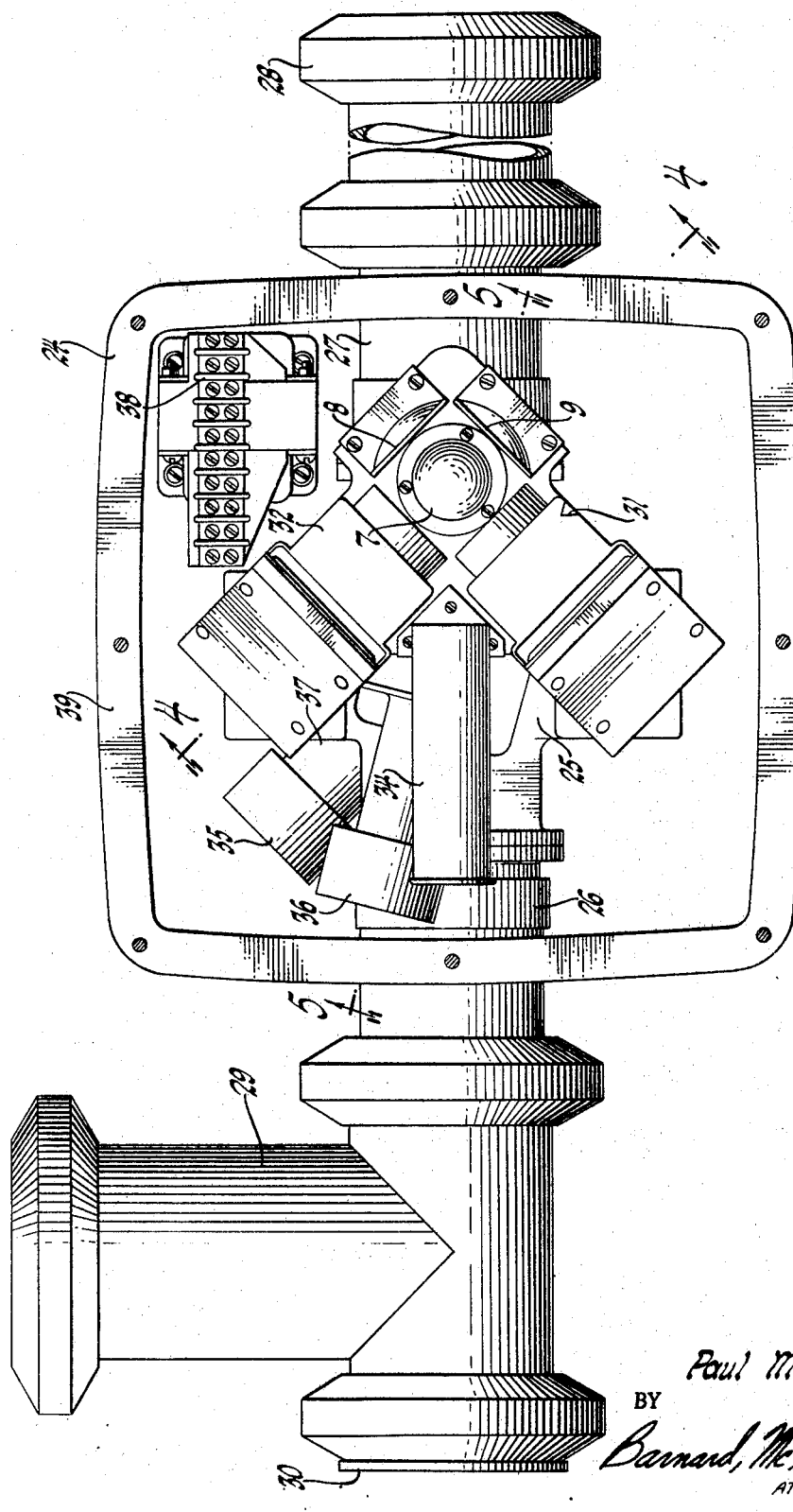
FIGURE 3 is a side view, with parts removed, of a turbidity indicator embodying the system shown in FIGURE 1.
Figure 4:
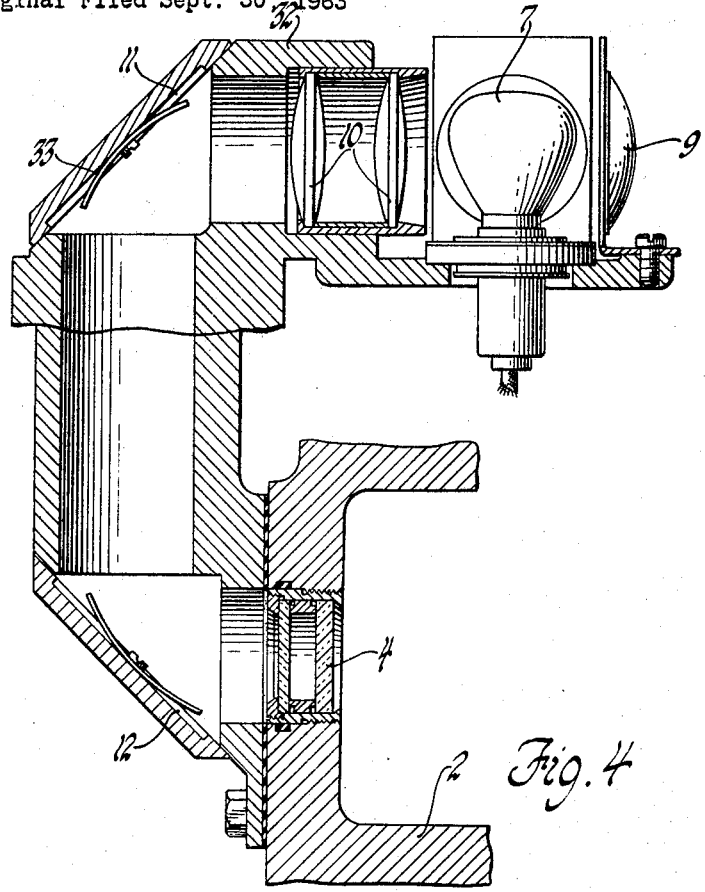
FIGURE 4 is a partial view taken on the line 4—4 of FIGURE 3 and showing the light directing system of the turbidity indicator.
Figure 5:
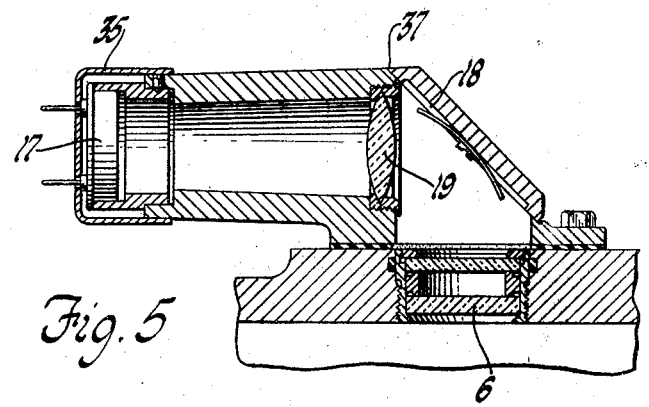
FIGURE 5 is a partial view taken on the line 5—5 of FIGURE 3 and showing the light sensing system of the turbidity indicator.

Referring again to FIGURE 1, the photosensitive elements are electrically connected to a suitable control which can be of conventional circuitry to convert the electrical information from the photosensitive elements to turbidity readings. The electrical system can, for example, be a bridge circuit similar to that shown in my copending U.S. patent application alluded to above. Also, a monitor photosensitive cell 20 positioned to receive light directly from the light bulb 7 is electrically connected to the control, there also being an electrical connection from the control to the light bulb. If the light intensity of the bulb 7 increases or diminishes during use of the instrument, this information is fed by the photosensitive element 20 to the control to thereby actuate a variable resistor or the like and increase or decrease, as the need dictates, the amount of current to the light bulb and cause its intensity to increase or decrease to the initial predetermined intensity level. This assures constancy of light intensity from the bulb and hence constant intensity light beams through the chamber as are essential to accurate turbidity readings. If desired, the intensity of the light bulb can be allowed to vary and the photosensitive element 20 used in a comparison circuit whereby the turbidity readings instead of being taken directly from the elements 16 and 17 are taken from a comparator between the elements 16, 17, and element 20. For simplicity, however, the circuit shown, wherein the bulb intensity is maintained constant, is preferred FIGURES 3, 4, and 5 show a preferred turbidity indicator incorporating the system shown in FIGURE 1. The device shown comprises an outer protective housing 24 which encloses the viewing chamber 2. The viewing chamber is formed by a pipe 25 which is of circular cross section at the ends 26 and 27 thereof, but of generally rectangular cross section at the center thereof. The extremities 26 and 27 of the chamber are connected to a fluid inlet 28 and a fluid outlet 29, respectively, to provide fluid flow through the chamber, a window being provided at 30 to afford visual sighting into the chamber through the outlet side thereof. Preferably the device is positioned such that the chamber is vertical with sight window 30 at the top. The rectangular portion of the chamber is provided with a pair of oppositely disposed light beam admitting windows, one of which is shown at 4 in FIGURE 4, and with oppositely disposed viewing windows, one of which is shown at 6 in FIGURE 5. Each window comprises two separate glass plates to provide a good seal and to prevent condensation or fogging resulting from temperature differences between ambient and process temperatures. The light beam directing system is embodied in a subassembly 31, the condensing lens system 10 (see FIGURE 4) being housed within a cylindrical casing 32 whereby the beam is directed to the mirrors 11 and 12 and thence through the window 4. Spring clips such as shown at 33 are used to secure the mirrors 11 and 12 thereby allowing easy removal thereof for cleaning. The casing for the monitor cell 20 is shown at 34 in FIGURE 3 and the casings for photosensitive elements 16 and 17 are shown at 35 and 36, respectively. As can be seen in FIGURE 5, the condensing lens 19 for the photosensitive element 17 are positioned in a tubular casing 37 which is bolted closely and therefore compactly to the viewing chamber.

The indicator of FIGURES 3–5 as previously described provides a compact construction; this compact construction is obtained by folding the beams approximately 90° at the mirrors 11 and directing the beams generally transversely to the original plane of the beams.

Referring again to FIGURE 3, an electrical contact assembly for forming the electrical connections between the control panel (not shown) and the light source and photosensitive elements is shown at 38. A cover plate (not shown) fits against the flange 39 to complete the sealed housing 24 for the viewing chamber and its associated light beam directing and viewing systems. The interior walls of the viewing chamber are coated with a dull black finish to minimize light reflection therefrom.

The turbidity indicator shown in FIGURES 1 through 5 and described above operates solely on the Tyndall effect and is useful chiefly for the measurement of turbidity in low level turbidity fluids such as in water purification plants, for clear beverages etc. For intermediate or high turbidities, it is desirable to use absorption effect readings or a combination of absorption effect and Tyndall effect readings. The systems shown in FIGURES 6, 7 and 8 can be used to take single or combined readings and hence are particularly useful where it is desired to use a single instrument for the measurement of fluids of greatly varying turbidities.

Figure 6:
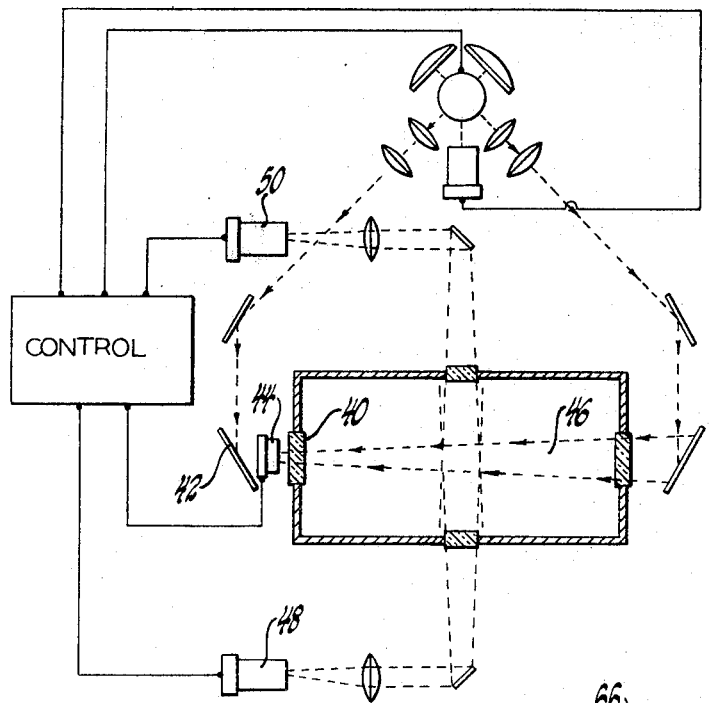
FIGURE 6 is a diagrammatic view of another embodiment of the invention adapted to take both Tyndall effect and absorption effect readings.

The device shown in FIGURE 6 is substantially the same as that shown in FIGURE 1 except that there is provision for removably inserting between one of the light beam admitting windows 40 and its adjacent mirror 42 a photosensitive element 44. It will be manifest that with the photosensitive element 44 removed, the instrument operates the same as that shown in FIGURE 1, only Tyndall effect readings being taken. With the photosensitive element 44 inserted, as shown, the device utilizes only a single beam of light 46 and three turbidity readings are taken, two Tyndall effect readings by the photosensitive elements 48 and 50 and one absorption effect reading taken by the photosensitive element 44. This is particularly useful for fluids of intermediate or high turbidity, it being understood that all three readings can be integrated to a single turbidity reading.

Figure 7:
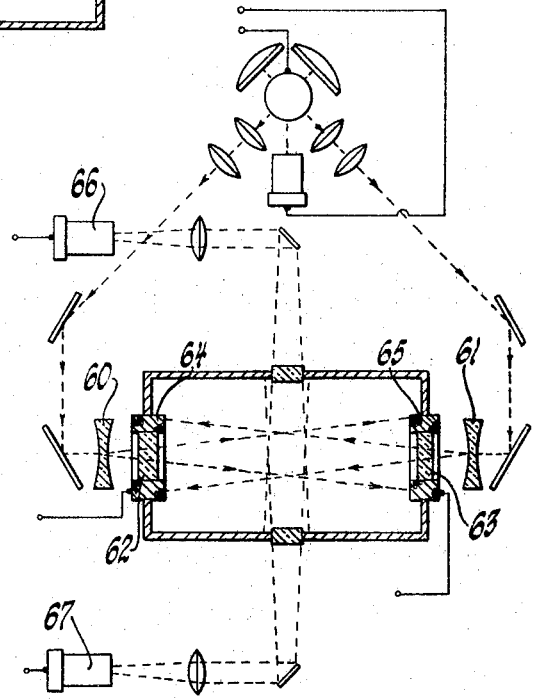
FIGURE 7 is a diagrammatic view of another embodiment of the invention adapted to take both Tyndall effect and absorption effect readings.

The device shown in FIGURE 7 is also similar to that shown in FIGURE 1 but with the following exceptions. The light beams projected through the fluid instead of being convergent are divergent, the lenses 60 and 61 causing such divergence as shown. Each of the light admitting windows 62 and 63 is surrounded by an annular photosensitive element 64 and 65 respectively, and the divergence of each light beam is such that it covers not only the area of the oppositely disposed light admitting window but also the area of the annular photosensitive element surrounding such window. With this system, the two photosensitive elements 66 and 67 can function to take Tyndall effect readings on low or intermediate turbidity fluids and absorption effect readings on high turbidity fluids. The annular photosensitive elements 64 and 65 provide absorption effect readings and are therefore particularly useful for high turbidity fluids. The readings from all four cells or from any combination thereof can be integrated to provide a single turbidity reading on the fluid being measured and suitable switches can be used to de-actuate one or both of the cells in either of the pairs of cells where the turbidity level of the fluid is such that less than all four cells are needed. The use of divergent light beams instead of convergent light beams has the disadvantage of providing a lesser light flux in the viewing field of the two photosensitive elements 66 and 67. Hence, where the size of the viewing chamber, or more properly the distance between the windows 62 and 63, is sufficiently large, it is preferable that each of the beams be convergent but with its image point within the chamber, to the light beam admitting window side of the view axis of cells 66 and 67 and sufficiently spaced from the oppositely disposed window that the beam diverges beyond its image point sufficiently to impinge on the annular photosensitive element. In this way higher light flux can be attained in the viewing field of elements 66 and 67 while yet having the beams impinge on cells 64 and 65.

Figure 8:
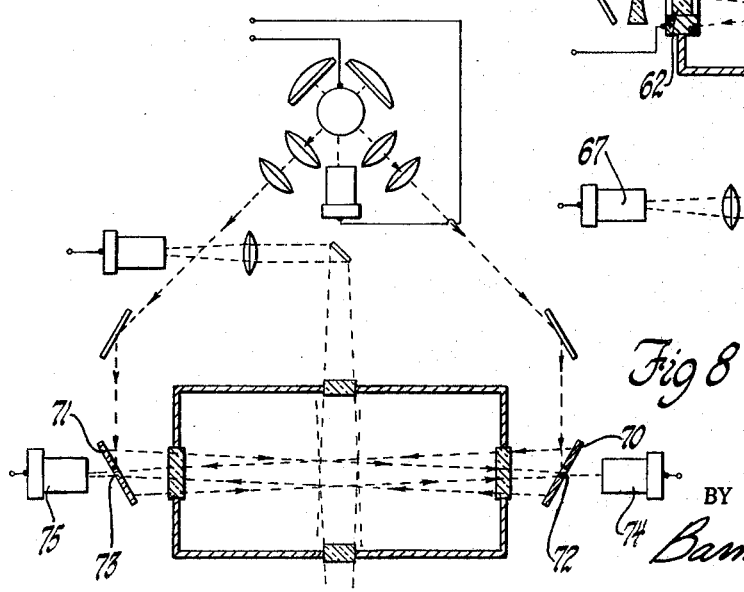
FIGURE 8 is a diagrammatic view of still another embodiment of the invention also adapted to take both Tyndall effect and absorption effect readings.

The system shown in FIGURE 8 is similar to that of FIGURE 7, in that two pairs of photosensitive elements are available, one pair for absorption effect readings and the other pair of either Tyndall effect or absorption effect readings. Opposed convergent light beams are used and two photosensitive elements with a common viewing axis transverse to the light beams are positioned for Tyndall effect readings, all as in the embodiment shown in FIGURE 1. The mirrors 70 and 71 adjacent the light admitting windows are provided with a central aperture, 72 and 73 respectively, and photosensitive elements 74 and 75 are positioned behind such apertures. Hence, the convergent light beams project through the oppositely disposed light admitting windows and thence through the aperture in the mirror behind such window and into the photosensitive element in line with such aperture. The two cells 74 and 75 are therefore available for absorption effect readings.

The apparatus of this invention finds utility for measuring the turbidity of water, as in water purification plants, sewage treatment plants and the like, in the beverage industry, the paper industry, etc. Where the level of ambient light is high, light traps can be provided to shield the fluid inlets and outlet to the viewing chamber. The source of power may be batteries or convenient alternating current. If alternating current is used, some means of stabilizing against fluctuation should be provided to reduce line current drift effects on the measurement. While photosensitive cells are desirable, the present invention may also use emissive type light sensitive cells. For extreme precision in measurement of liquids which vary greatly in temperature well-known electrical temperature controls may be provided to stabilize the temperature of the cells and prevent drift caused by liquid temperature changes. Temperature control apparatus for cells 16 and 17 in FIGURE 1 are generally indicated by the numerals 16a and 17a, respectively. The provision of such controls automatically compensate for ambient and process temperature variations and greatly enhances the stability and accuracy of the indicator.

In actual tests using the device, the instrument has been found extremely accurate even at very low turbidity levels. For example, measurements have been made with the device shown in FIGURE 3, in fairly substantial increments, at levels as low as one part in 1,000,000,000 and at levels higher than 10,000 parts per million.

The device is sufficiently sensitive and accurate to be useful as a laboratory instrument and yet is of such rugged compact construction as to be well suited for industrial usage in water purification plants, etc. as alluded to above.

It will be understood that while the invention has been described specifically with reference to preferred embodiments thereof, various changes and modifications may be made all within the full and intended scope of the claims which follow. For example, the invention can be embodied in such manner as to utilize various of the features shown in my copending U.S. application to which reference has been made.

What is claimed is:

1. Apparatus for measuring the turbidity of a fluid comprising a fluid chamber, first means including a light source for projecting into said chamber a pair of substantially oppositely projected generally superimposed light beams and including second means for converging said light beams as they are directed into said chamber and directing said light beams to cross each other at a preselected position, at least one photosensitive element, and third means providing a divergent field of view for said photosensitive element with its axis generally transverse to and intersecting said light beams at said preselected position, the image point for each said light beams being located beyond the axis of the field of view and outside of said fluid chamber, and further comprising a second photosensitive element, and fourth means locating said second photosensitive element and providing a divergent field of view oppositely directed and generally superimposed with the field of view of said one photosensitive element.

2. Apparatus as set forth in claim 1 wherein each of said third and fourth means including a mirror for reflecting the light towards the associated one of said photosensitive elements at substantially less than 180° whereby a compact structure can be realized.

3. Apparatus as set forth in claim 1 wherein said light beams and said fields of view are of circular cross section and wherein the diameter of said fields of view at their intersection with the light beams is at least as large as the diameter of the light beams at such intersection and less than twice said diameter of the light beams.

4. Apparatus as set forth in claim 1 including two oppositely disposed light admitting windows for transmitting said light beam into said chamber and wherein the light projecting means for each of said light beams includes a mirror set at an angle behind one of said windows and having light transmitting means through one said mirror, and a third photosensitive element positioned to receive light passing through said light transmitting means.

5. Apparatus for measuring the turbidity of a fluid comprising a fluid chamber, first means for projecting into said chamber a pair of substantially oppositely directed, generally superimposed light beams, first and second photosensitive elements, of view third means locating said photosensitive elements and providing fields for said photosensitive elements, third means locating said photosensitive elements and providing fields of view for said photosensitive elements with axes of said fields of view being generally transverse to and intersecting said light source and in directions coincident with the directions of said pair of light beams as they are initially transmitted from said source, said light source being a single light bulb and with said reflectors being located around 90° apart, said first means further including lens means for directing said beams in a first plane defined generally by the axes of said light source and said reflectors, reflecting means for directing said light beams in a second plane in a selected direction generally transversely to said first plane whereby a compact structure can be provided, said reflecting means further directing said light beams in said second plane transversely to said selected direction whereby said light beams are superimposed, and said chamber having a first pair of windows for transmitting said light beams into said chamber and a second pair of windows located transverse to said light beams through said chamber for transmitting reflected light out from said chamber to said first and second photosensitive elements.

6. The apparatus of claim 5 with said reflecting means comprising a pair of mirrors for each of said light beams and with said first means further comprising at least one condensing lens for each of said light beams, said third means comprising first and second respective mirrors and condensing lenses for directing the reflected light of said light beams in said chamber to said first and second photosensitive elements.

References Cited

UNITED STATES PATENTS

| | | | |
|---|---|---|---|
| 2,021,507 | 11/1935 | Hanks | 352—60 X |
| 2,486,622 | 11/1949 | White. | |
| 2,549,866 | 4/1951 | Uhl. | |
| 2,669,901 | 2/1954 | Rehorn | 352—60 X |
| 2,684,008 | 7/1954 | Vonnegut. | |
| 3,177,706 | 4/1965 | Shuman et al. | |
| 3,177,760 | 4/1965 | Albert. | |
| 3,234,846 | 2/1966 | Cropper et al. | |

FOREIGN PATENTS

| | | |
|---|---|---|
| 1,308,348 | 9/1962 | France. |
| 888,802 | 9/1953 | Germany. |

OTHER REFERENCES

J.S.M.P.E., vol. 49, No. 6, pp. 508–509, December 1947.

JEWELL H. PEDERSEN, Primary Examiner

W. A. SKLAR, Assistant Examiner

U.S. Cl. X.R.

250—218; 340—237; 356—104, 208

UNITED STATES PATENT OFFICE
CERTIFICATE OF CORRECTION

Patent No. 3,506,360                          April 14, 1970

Paul McHenry Albert

It is certified that error appears in the above identified patent and that said Letters Patent are hereby corrected as shown below:

Column 4, line 2, after "Each" insert -- such --. Column 6, line 56, "of" should read -- for --. Column 8, line 11, cancel "of view third means locating said photosensitive elements and providing fields for said photosensitive elements"; line 15, after "with" insert -- the --; line 17, "source" should read -- beams --; same line 17, after "beams" insert -- , said first means comprising a light source and a pair of reflectors for reflecting light back to said light source, --.

Signed and sealed this 18th day of August 1970.

(SEAL)
Attest:

EDWARD M. FLETCHER, JR.                    WILLIAM E. SCHUYLER, JR.
Attesting Officer                             Commissioner of Patents